(12) United States Patent
Feller

(10) Patent No.: US 7,684,938 B1
(45) Date of Patent: Mar. 23, 2010

(54) SELF-CLEANING ULTRASONIC FLOW SENSOR

(76) Inventor: Murray F Feller, 21577 NW. 75th Avenue Rd., Micanopy, FL (US) 32667

( * ) Notice: Subject to any disclaimer, the term of this patent is extended or adjusted under 35 U.S.C. 154(b) by 217 days.

(21) Appl. No.: 11/958,403

(22) Filed: Dec. 18, 2007

(51) Int. Cl.
*G01F 1/66* (2006.01)
(52) U.S. Cl. ........................................ 702/48
(58) Field of Classification Search ................ 702/48
See application file for complete search history.

(56) References Cited

U.S. PATENT DOCUMENTS

| 4,336,719 | A |   | 6/1982 | Lynnworth |         |
|-----------|---|---|--------|-----------|---------|
| 4,601,210 | A |   | 7/1986 | Brown     |         |
| 5,384,029 | A | * | 1/1995 | Campbell  | 204/415 |
| 6,178,827 | B1 |  | 1/2001 | Feller    |         |
| 6,422,093 | B2 |  | 7/2002 | Feller    |         |
| 6,508,134 | B1 |  | 1/2003 | Feller    |         |

\* cited by examiner

*Primary Examiner*—Tung S Lau
(74) *Attorney, Agent, or Firm*—David Kiewit

(57) ABSTRACT

Acoustic windows that are portions of an ultrasonic sensor used to measure a rate of flow of a fluid are wetted whenever the fluid is present. These windows may become coated with a contaminant film during operation. The contaminant may be removed by applying an acoustic cleaning signal to the same ultrasonic transducers used in the flow measurement. The cleaning signal frequency is commonly on the order of one to a few tens of kilohertz, which is substantially less than the measurement signal frequency, which is commonly on the order of a few megahertz. Several approaches are described that isolate the cleaning and measurement functions and that provide protection to signal amplifiers that are used in the measurement process and that could be damaged by high cleaning voltages.

2 Claims, 2 Drawing Sheets

SELF-CLEANING ULTRASONIC FLOW SENSOR

BACKGROUND OF THE INVENTION

1. Field of the Invention

This invention relates to apparatus for and method of operation of a self-cleaning ultrasonic flow sensor that may provide for a longer period of operation before maintenance is required.

2. Background Information

Ultrasonic flow rate measurements are well known and comprise both differential transit time (time of flight) and Doppler approaches. Differential transit time arrangements are exemplified in the inventor's U.S. Pat. Nos. 6,508,134, 6,422,093, and 6,178,827. These instruments typically operate at ultrasonic frequencies of 500 kHz to four megahertz.

Ultrasonic sensors are often used to measure the flow of inadequately treated or untreated water. In these cases materials present in the water commonly settle out on windows used to couple the ultrasonic signals into and out of the flowing fluid. This eventually attenuates and/or distorts the acoustic signals to a degree at which performance is degraded, thus requiring a maintenance operation. Avoiding or forestalling the need for maintenance would thus provide a significant benefit to the flow measurement art.

Ultrasonic cleaners are also well known. These devices generally provide a fluid bath in which an article to be cleaned is immersed. In cleaning operations of this sort, the fluid is commonly insonified at frequencies on the order of tens of kilohertz.

BRIEF SUMMARY OF THE INVENTION

One aspect of the invention is that it provides apparatus and method for cleaning acoustic windows that are part of an ultrasonic sensor used to measure a rate of flow of a fluid. These windows are wetted whenever the fluid is present. In addition to the windows, a sensor of this sort also comprises ultrasonic transducers, each acoustically coupled to an unwetted side of its acoustic window. A measurement signal generating circuit in the sensor is operable, when connected to the ultrasonic transducers, to generate a measurement acoustic signal in the fluid at a measurement signal frequency that is commonly on the order of 500 kHz to four megahertz. As is conventional in ultrasonic flow measurement instrumentation, a signal processing circuit portion of the sensor is operable, when connected to the ultrasonic transducers, to receive electrical measurement signals at the measurement signal frequency. In preferred embodiments of the invention the apparatus also comprises a cleaning signal generating circuit operable to generate an acoustic cleaning signal at a cleaning signal frequency that is substantially less than the measurement signal frequency and that is commonly on the order of a few tens of kilohertz. In addition, a preferred apparatus also comprises a timing circuit operable to connect, at any selected instant, only one of the measurement signal generating circuit and the cleaning signal generating circuit to the ultrasonic transducers.

Another aspect of the invention is that it provides a preferred ultrasonic flow sensor that uses the same pair of transducers both for determining a fluid flow rate and for cleaning protective window surfaces. In some such devices, the measurement and cleaning signals are routed to the transducers at separate selected time intervals. In other such devices a measurement signal processing circuit is disabled, or an output thereof is ignored, during a cleaning interval.

In a preferred embodiment, frequency selective combinations of reactive elements are used in conjunction with the same or separate signal amplifiers to provide the electrical signals for the flow rate measurement and for the cleaning function. The operating frequencies for measurement and for cleaning are very different. A frequency of several MHz is typical for measurement functions and a frequency of tens of KHz is typical for cleaning applications. The large frequency difference enables those functions to be performed with a high degree of isolation between their respective circuit elements. Hence, the measurement function is not degraded in precision and the cleaning function can be performed at a high enough power level to be effective. Cleaning functions are preferably performed on a scheduled or sensed need basis at a relatively high power level. The measurement function is preferably disabled during cleaning intervals.

In one preferred embodiment, separate signal sources are used for the measurement and cleaning functions. These are connected to the transducers through a discriminator circuit comprising series resonant circuits having some common elements. The circuits are optimized for their respective functions and relatively high power may be employed for either or both of the measurement and cleaning functions.

In another preferred embodiment, a switch operable under control of timing circuits is used to supply a signal from only one of a measurement signal source and a cleaning signal source to an input of a discriminator circuit so as to controllably power the measurement and cleaning functions. A single amplifier can be used to provide high levels of either the measurement or the cleaning signals. Because of perceived difficulties in selecting components to optimize both functions, this embodiment may best be employed where moderate cleaning power levels are needed.

In yet another embodiment a nonlinear device such as a FET is used to add a cleaning voltage component to the measurement signal applied to the transducers. This produces cleaning signal pulses while the lower level, higher frequency acoustic transmissions are occurring. Although this cleaning pulse is also of relatively low magnitude, the cost to provide it is relatively low.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

DETAILED DESCRIPTION OF A PREFERRED EMBODIMENT

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases. At the outset of this Description, one may note that the terms "include" and "comprise," as well as derivatives thereof, mean inclusion without limitation; the term "or," is inclusive, meaning and/or; 'frequency' denotes not merely a single frequency, but also includes minor dispersion about a nominal selected frequency and variations within a frequency band associated with Doppler changes; and a 'switch' includes a switching circuit having a finite impedance ratio and is not limited to a mechanical switch or to any other switching arrangement having a nearly infinite impedance ratio.

Figure 1:
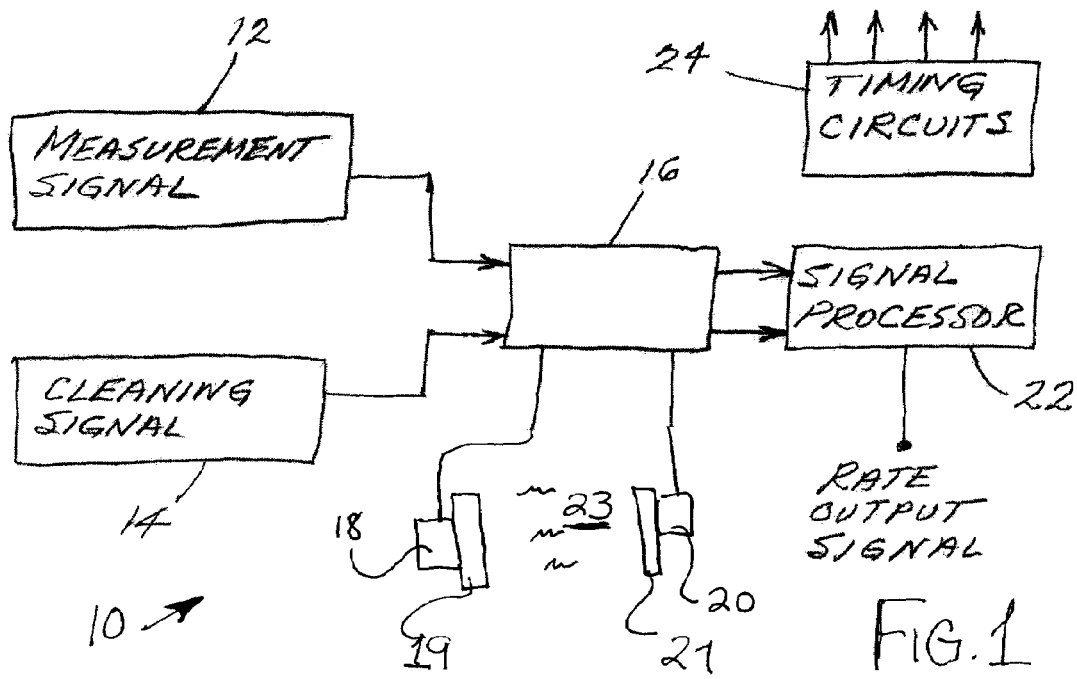
FIG. 1 is a schematic block diagram of apparatus of the invention

An acoustic flow sensor 10 illustrated in FIG. 1 comprises a measurement signal source 12 and a cleaning signal source 14. Both are connected to a discriminator circuit 16 that is also connected to two transducers 18, 20 and to a signal processor 22, which may comprise one or more amplifiers and a microcontroller. The signal processor 22 provides a flow rate output as well as timing 24 and other signals. Timing circuits 24 are connected to the other blocks as required to provide the signals for sequencing all of the operating functions so that they proceed at their appointed times.

The transducers 18, 20 are acoustically coupled to respective acoustic windows 19, 21, each of which has one of its two surfaces arranged to be wetted by the flowing fluid 23 whenever the fluid is present. As hereinbefore noted, contaminants, such as entrained dirt, scale, etc. may be deposited on, or otherwise build up on the wetted surfaces of the windows 19, 21 and thereby affect acoustic transmissions through the fluid 23.

During measurement operation the measurement signal is directed through the discriminator circuit 16 to both transducers 18, 20 in order to propagate acoustic signals through a flowing fluid 23. The received acoustic signals, when converted into electrical signals, are directed by the discriminator circuit 16 to the signal processor 22 that derives the time differences between the signals and thereby determines the rate output signal. The signal processor can also detect the magnitude of the received signals and, if that magnitude is below an established reference level, can enable the cleaning signal pulses to be impressed across the transducers. This is preferably done at a time not coincident with the acoustic transmissions used in the flow measurement operation. The cleaning signal pulses could also be regularly enabled on a scheduled basis, rather than being provided responsive to a measured acoustic signal decrease.

Figure 2:
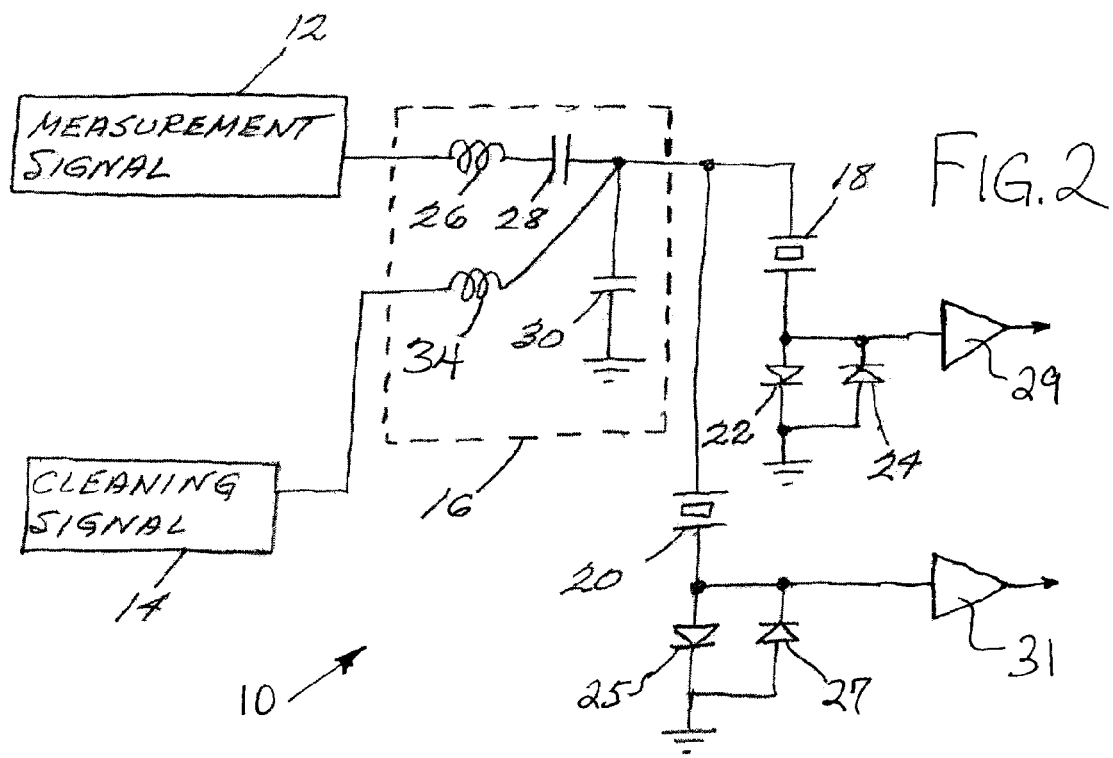
FIG. 2 is a schematic circuit diagram of a first embodiment of the invention.

FIG. 2 shows a preferred embodiment in which the discriminator circuit 16 contains two inductors 26, 34 and two capacitors 28, 30. One of the inductors 26, of relatively small inductance, is series resonant with the combination of a relatively small capacitor 30 to ground and the shunting capacitances of the piezoelectric transducers 18, 20 at the transducer measurement frequency. The other inductor 34, of relatively high inductance, is series resonant at the cleaning signal frequency with the relatively large capacitor 28 and all of the capacitances associated with that signal. In addition to the discriminator circuit 16, FIG. 2 also shows protection diodes 22, 24, 25, 27 used to protect the following receiving signal amplifiers 29, 31.

In a particular preferred embodiment the measurement signal source 12 is a model MAX 5048B supplied by the Maxim Corporation. In this embodiment it provides measurement signal acoustic bursts at about one MHz. Resonance at this frequency is obtained by choosing an inductor 26 having an inductance of ten microhenries and a capacitor 30 having a capacitance of 2.2 nanofarads. A few hundred picofarads of additional capacitance is typically associated with the transducers 18, 20. During measurement operation the cleaning signal source 14 is preferably at a ground state so that it does not have to disconnect from a potentially high voltage. Another virtue of this circuit arrangement is that with a relatively low resistance path in the series resonant circuit, and therefore high Q, the voltage appearing across the transducers can be much higher than the original measurement signal. For example, for a Q equal to ten, the transducer voltage is ten times that of the output from the measurement signal source 12.

The protective diodes 22, 24, 25, 27, which may be of type IN4148, typically function to protect the following signal amplifiers 29,31 during the acoustic signal transmission and also during the cleaning operation. During transducer reception of the acoustic signals the shunt capacitor 30 effectively grounds one end (e.g., the top of the transducer symbol depicted in FIG. 2) of the transducers so that their other ends (e.g., the bottoms thereof) can provide signals to their respective amplifiers. The amplifiers 29, 31 may be Intersil EL5263 dual op amps and are preferably of the current amplifying type having near zero input impedance. In this embodiment the negative inputs of the op amps are connected directly to the diodes and to gain-controlling feedback components (not shown) and the positive inputs are grounded. Alternately, the amplifies can be connected through switches (not shown). Hence, the signal voltage across the diodes 22, 24, 25, 27 is very low. The effect of these diodes on circuit operation during the time difference measurement of the acoustic signal is therefore negligible.

During the transducer cleaning operation of a preferred embodiment of the circuit depicted in FIG. 2 a cleaning signal is supplied from another Maxim MAX 5049B source at a desired frequency of 50.8 kHz. Choosing an inductor 34 having an inductance of one millihenry and a series capacitance 30 having a capacitance of ten nF, together with all of the capacitance connected to it, provides resonance at that frequency. During cleaning, the measurement signal source 12 is preferably at a ground state so that it does not have to disconnect from a potentially high voltage. This can be a large economic advantage because high voltage, high frequency switches are relatively uncommon and likely to be expensive. Another advantage of this arrangement is that with a relatively low resistance path in the resonant circuit, and therefore a high Q, the voltage appearing across the transducers can be much higher than the original cleaning signal as in the measurement description above. Yet another advantage of this arrangement is that the separation of the measurement and cleaning signal sources enables each source to be optimized for its unique function so that the cleaning signal source, for example, could thereby efficiently and economically provide a much higher magnitude signal. A relatively high cleaning voltage applied to the transducers is desirable when aggressive cavitation cleaning is to be carried out. In order to dislodge deposits, the acoustic windows may have to be displaced through a much larger amplitude than that used to make a flow rate measurement.

It is noted that the transducers are usually optimized for the measurement function and are normally dimensioned to have a resonance peak at the measurement operating frequency. Transducer assemblies may also contain reactance and/or resonating elements to improve transducer efficiency and acoustic coupling to the fluid at the measurement frequency. While similar approaches may be utilized for cleaning assemblies of this sort the much lower operating frequency will be limiting. This limitation is compensated for at least in part, by the high cleaning voltage obtainable with the relative ease of the FIG. 2 configuration.

When operated at a frequency far below any of their mechanically resonant frequencies, as in a cleaning application of the sort described herein, piezoelectric transducers typically function electrically as capacitors of fair to medium Q (50 to 100). The inductors with which they resonate during cleaning can have similar Qs. The bandwidth of the resulting resonant circuits can be relatively small, 1 to 3% of the cleaning frequency for example, so that component values which result in a resonant frequency different from the design frequency because of manufacturing tolerances and drift, can seriously reduce the magnitude of the cleaning voltage applied to the transducers. This problem can be remedied by having the frequency of the cleaning signal controlled by the resonant circuit so that it always strives towards a maximum output exemplified by conventional LC feedback oscillators.

In addition to cleaning, the cleaning operation may also have a stabilizing effect on the measurement operation by enabling the transducer element surface in contact with its window to readjust that contact and recover from mechanical changes due to temperature changes, moisture absorption, aging effects etc. This recovery is facilitated when the transducer is pressed against its associated window as is the case when one uses thin windows in a pressured environment or provides a spring bias within the transducer assembly.

Figure 3:
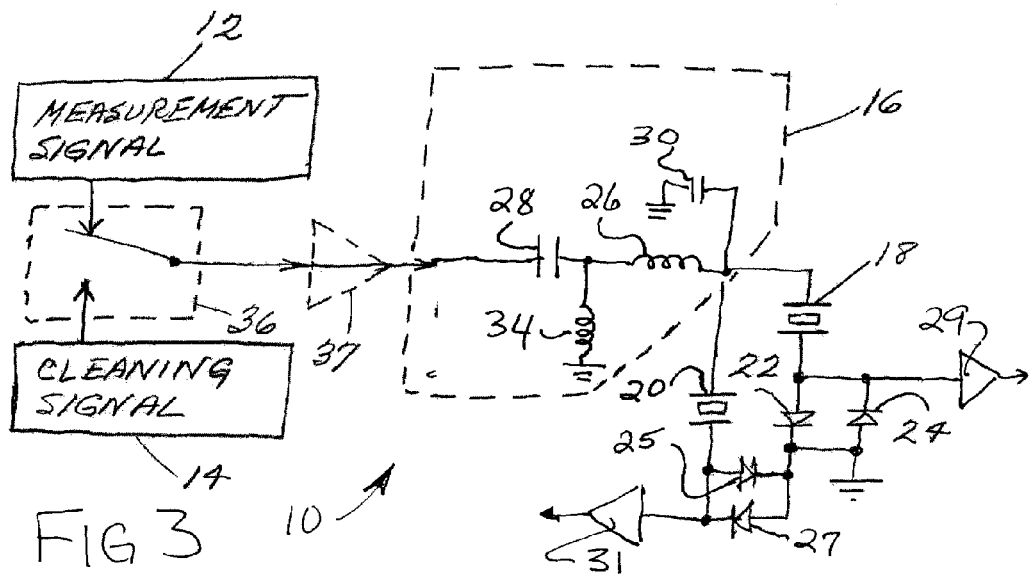
FIG. 3 is a schematic circuit diagram of a second embodiment of the invention.

Another of many possible embodiments of the invention is depicted in FIG. 3. The operating frequencies and component values can be the same as those of FIG. 2. This embodiment is generally expected to have a somewhat lower power potential, when compared to the embodiment of FIG. 2, even when a common amplifier 37 is used. In FIG. 3 the measurement 12 and cleaning 14 signal sources are switched by means of a switch 36. In this embodiment the discriminator circuit 16 comprises several inductors 34, 26 and capacitors 28, 30 and is connected to the transducers 18, 20 and their associated protective diodes 22,24,25,27. During measurement operation of this embodiment of the invention a capacitor 28 couples the measurement signal to a series resonant circuit consisting of an inductor 26, a shunting capacitor 30 and the shunting capacitance of the transducers 18, 20. The values of the inductor 34 and of the capacitor 28 are large enough so that they do not significantly affect the measurement operation. During cleaning operation, the switch 36 is controlled by the timing circuits 24 to connect the cleaning signal to the series resonant circuit, primarily consisting of a capacitor 28 and an inductor 34, a shunt capacitor 30 and the shunting capacitance of the transducers 18, 20.

Because the switch 36 of FIG. 3 switches low impedance loads, a relatively low voltage, high frequency switch is required. Components of this sort are readily available and relatively inexpensive. Alternatively, one can choose measurement and cleaning signal sources that provide low level signals to the switch 36 and then amplify the selected signals by a common amplifier 37 to provide the signals to the discriminator circuit. The common amplifier 37 needs to amplify the relatively high measurement frequency signals and can be a limiting factor on the power available for the cleaning function.

Figure 4:
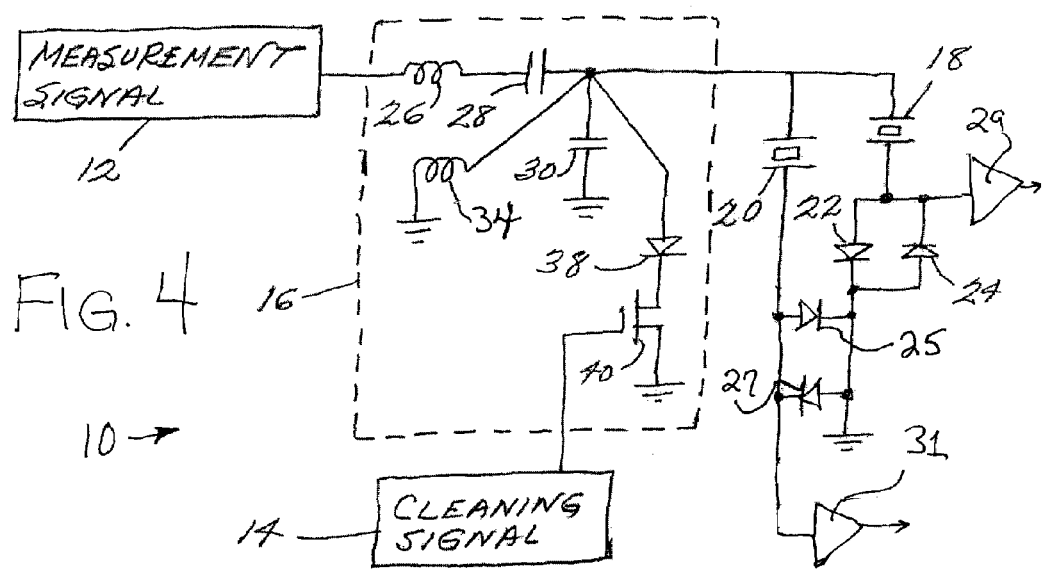
FIG. 4 a schematic circuit diagram of a third embodiment of the invention.

Turning now to FIG. 4, one finds another embodiment of circuitry of the invention. As with FIG. 3, the operating frequencies and component values can be the same as those of FIG. 2. In this embodiment the measurement signal from the measurement signal source 12 is supplied to a discriminator circuit 16 comprising two inductors 26, 32 and two capacitors 28, 30. One of the inductors 26 has a relatively small inductance and is series resonant with a shunt capacitor 30 and the shunting capacitance of the piezoelectric transducers 18, 20 at the transducer measurement frequency. The other inductor 34 is selected to have a relatively high inductance and is parallel resonant with capacitor 28 and with all other capacitances at the cleaning signal frequency. As with other embodiments, protective diodes 22, 24, 25, 27 are used with following signal amplifiers 29, 31.

During the measurement operation of the circuit of FIG. 4, the measurement signal is routed through an inductor 26 and a capacitor 28 to the transducers 18, 20. During cleaning, the cleaning signal source 14 controls a switching element, which is preferably an N-channel field effect transistor (FET) 40, to switch into and out of its conductive state. The FET 40 is connected to the cathode of a diode 38 which has its anode connected to a high voltage signal junction supplying the transducers. The diode 38, by rectifying the signal when the FET 40 conducts, develops an oscillating voltage across the resonant circuit which adds a cleaning signal component to the measurement signal. In this case the measurement signal circuit is still active during the cleaning phase although no meaningful flow rate output is available. For example, the signal processor 22 may be programmed to suppress flow rate output during cleaning intervals.

The cleaning signal component provided to the transducers, which is available from the circuit of FIG. 4 has a magnitude approximately equal to that of the measurement signal source and is therefore limited in its cleaning ability when compared to the other methods described hereinbefore. However, if the cleaning generator need only supply a low level signal, the other components are inexpensive and readily available so that this configuration could be attractive for some applications.

This Detailed Description describes the invention only with respect to preferred embodiments in which two transducers operate simultaneously. However, those skilled in the art will recognize that one can readily apply the invention to many other configurations of ultrasonic flow sensors, the other configurations including, but not limited to Doppler sensors, sensors using other than two transducers, and sensors in which upstream and downstream acoustic pulses are supplied sequentially rather than simultaneously.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

The invention claimed is:

1. An ultrasonic flow sensor for measuring a rate of flow of a fluid, the sensor comprising:
   a spaced-apart pair of ultrasonic transducers, each transducer acoustically coupled to a first side of a respective acoustic window having a respective second side wetted by the fluid when the fluid is present;
   a measurement signal generating circuit operable, when connected to the ultrasonic transducers, to generate a measurement acoustic signal therefrom, the measurement acoustic signal characterized by a measurement signal frequency of at least five hundred kilohertz;

a signal processing circuit operable, when connected to the ultrasonic transducers, to receive an electrical measurement signal therefrom at the measurement signal frequency, the signal processing circuit further operable to output a signal representative of the rate of flow of the fluid; and a cleaning signal generating circuit operable, when connected to at least one of the ultrasonic transducers, to generate an acoustic cleaning signal therefrom, the acoustic cleaning signal characterized by a cleaning signal frequency of no more than one hundred kilohertz.

2. The ultrasonic flow sensor of claim 1 further comprising a timing circuit operable to apply a signal to the ultrasonic transducers, at any selected instant, from only one of the measurement signal generating circuit and the cleaning signal generating circuit.

* * * * *